Figure 1:
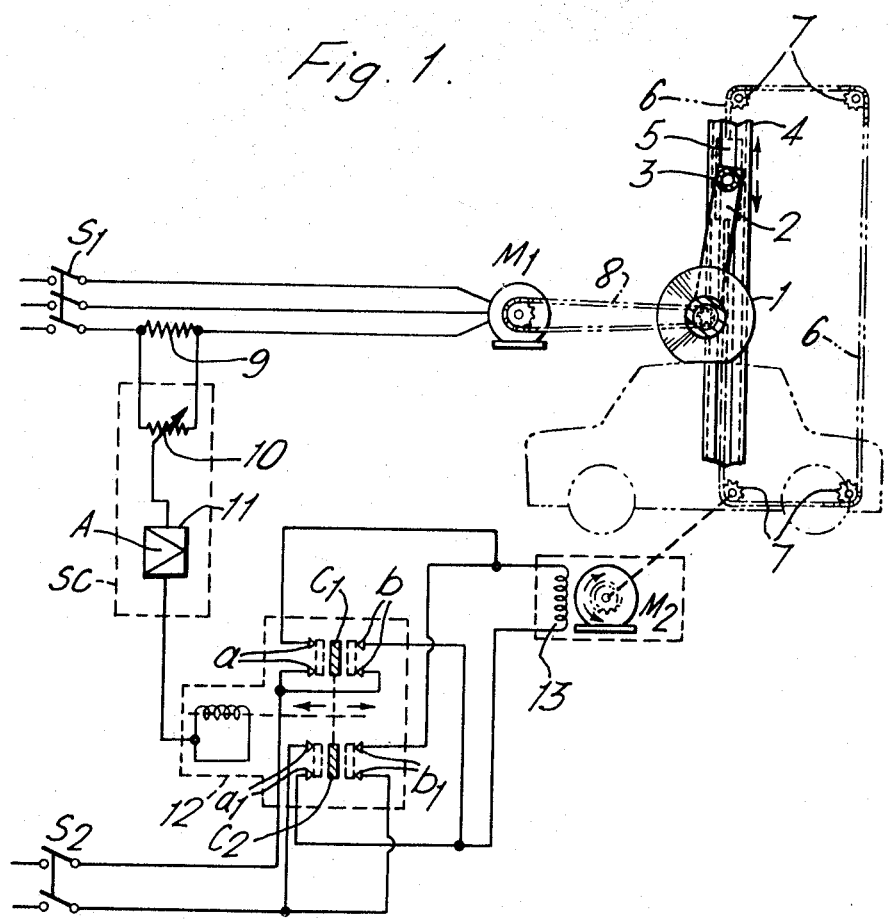

United States Patent
Kamiya

[15] 3,662,418
[45] May 16, 1972

[54] VEHICLE WASHING APPARATUS
[72] Inventor: Nobuyoshi Kamiya, Takarazukashi, Japan
[73] Assignee: Toyo Enterprises KK, Osaka, Japan
[22] Filed: July 16, 1970
[21] Appl. No.: 55,344

[30] Foreign Application Priority Data
July 17, 1969 Japan..................................44/68400

[52] U.S. Cl..............................15/21 E, 15/DIG. 2, 318/98
[51] Int. Cl. ............................................................B60s 3/06
[58] Field of Search......................15/DIG. 2, 21 D, 21 E, 53, 15/97, 302; 318/98

[56] References Cited
UNITED STATES PATENTS
3,425,080  2/1969  Dolitzsch et al........................15/21 E FOREIGN PATENTS OR APPLICATIONS
1,094,393  12/1967  Great Britain......................15/DIG. 2
1,141,947  2/1969  Great Britain......................15/DIG. 2

*Primary Examiner*—Edward L. Roberts
*Attorney*—Arnold Robinson

[57] ABSTRACT

A vehicle washing apparatus including frame-mounted overhead rotary brush assembly which can scrub the vehicle surface with a continuously applied optimum amount of scrubbing pressure, and which is caused to ascend and descend in increments as small or as large as required while the frame travels horizontally on its track, so that a vehicle can be automatically washed from front to back via the hood, roof and trunk portions.

8 Claims, 2 Drawing Figures

VEHICLE WASHING APPARATUS

This invention relates to a vehicle washing apparatus including a rotary brush and particularly although not exclusively to a generally horizontally arranged overhead rotary brush assembly.

Such an overhead rotary brush assembly may be caused to ascend and descend e.g., perpendicularly) in relation to the vehicle to be washed in accordance with the amount of scrubbing pressure to be applied to the vehicle surface while traversing the upper surfaces of the vehicle. This can enable the overhead brush to scrub with the desired pressure on vehicle surfaces ranges from the lowest parts at the front to the rear end bumper via the hood, roof, and trunk portions.

An overhead brush having a substantially horizontal axis, and carried on pivotable arms has been proposed. These arms are carried by the upper part of a travelling frame. A disadvantage of this arrangement is that, owing to its limited length of the arms, the overhead brush cannot reach every part of the upper surface of the vehicle, for example, in a case of a motor-car, it cannot scrub the front radiator-grid portion as well as the rear end face. This constitutes a serious demerit in an automatically operable apparatus of washing a vehicle.

To alleviate this problem, it has been proposed that the overhead brush should be caused to ascend and descend in relation to a stationary vehicle. This raises a new problem in respect of the adjustment of the amount of scrubbing pressure on the vehicle surface.

The present invention provides vehicle washing apparatus including a rotary brush drivable by an electric motor and means for moving the brush towards or away from the vehicle to be washed, in which the said means are controlled in response to the load on the driving motor.

Figure 2:
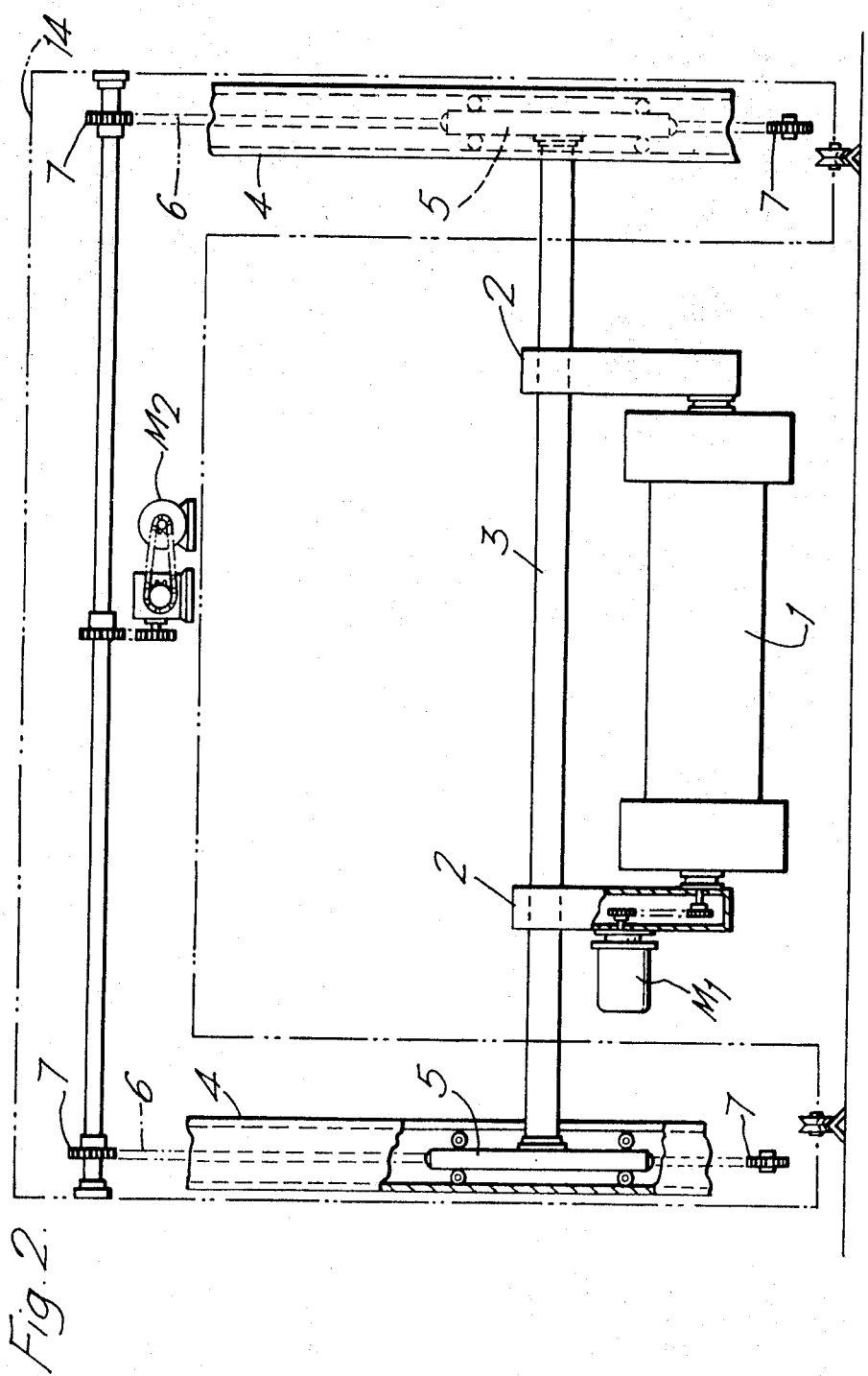

The preferred embodiment of the invention will now be particularly described with reference to the accompanying drawings, in which:

FIG. 1 is a schematic side view of apparatus in accordance with the invention, including a circuit diagram; and FIG. 2 is a schematic front view of the apparatus illustrated in FIG. 1.

An overhead brush 1, comprising a cylindrical sponge, hair brush, or like cleaning member, is supported on a spindle extending between arms 2, which arms are rigidly carried on a rod 3. Each end portion of the rod 3 is pivotably mounted on and carried by its respective carrier 5 which can move up and down the side wall of a travelling frame 4, driven by an adjusting motor $M_2$ through a chain 6 and a sprocket 7. In the example illustrated, a reversible torque motor $M_2$ is employed. The carriers 5 are moved up or down in accordance with the rotation direction of the motor $M_2$. The brush 1 is driven to rotate by a chain 8, itself driven by a reversible driving motor $M_1$ which is connected to an A.C. power source via a switch $S_1$. A resistor 9 is connected in series in a power line between the motor $M_1$ and the A.C. power switch $S_1$, and is also connected to a sampling circuit SC which detects variations in load current to the motor $M_1$ which occur due to changes in the amount of scrubbing pressure of the brush on the vehicle surface. The current variations are detected and amplified in the sampling circuit SC, and transmitted to a relay 12 where the contacts associated with the switch members $C_1$ and $C_2$ are selectively closed and opened as appropriate. In the example illustrated, the sampling circuit SC comprises a variable resistor 10 connected in shunt with resistor 9 and an amplifier 11. Alternatively, a potentiometer may be used in place of a variable resistor. The switch members $C_1$ and $C_2$ are biased normally to close the contacts which will energize coil 13 of motor $M_2$ so as to raise the brush 1. When the amplified signal from the amplifier 11 is sufficiently large to overcome this bias and cause the switch members $C_1$ and $C_2$ to the opposite sets of contacts, the brush 1 will be lowered. For example, when the switch members $C_1$ and $C_2$ are shifted to the left in FIG. 2, the contacts $a$, $a$ and $a_1$, $a_1$ are simultaneously closed, and the contacts $b$, $b$ and $b_1$, $b_1$ are opened, whereas, when they are moved to the right, the contacts $a$, $a$ and $a_1$,$a_1$ are opened, and the contacts $b$, $b$ and $b_1$, $b_1$ are closed. Thus, the field coil 13 is selectively supplied with D.C. power of different polarity from a D.C. power source connected via switch $S_2$ and relay 12 to the coil 13. The rotor of the adjusting motor $M_2$ is thereby caused to rotate either in the clockwise or the counter-clockwise direction.

The operation of the system described above is as follows.

The driving motor $M_1$ is energized through actuation of the switch $S_1$, with the brush 1 at its lowest possible position so as to scrub the lowest part of the front face of the vehicle, such as the bumper, or radiator grille. The travel of the travelling frame 4 is started, and the brush in rotating engages and scrubs the front fact of the vehicle. The operator adjusts the amount of scrubbing pressure on the vehicle surface by setting the resistance value of the variable resistor 10 in the SC circuit. The amount of scrubbing pressure may be determined by the extent to which the vehicle surface protrudes into the sponge or hair brush.

When the amount of scrubbing pressure becomes large, a larger load is applied on the driving motor $M_1$, causing an increase in load current and in the potential difference across resistor 9. When the increased voltage exceeds a predetermined value, it is detected in the resistor 10, and amplified in the amplifier 11. The amplified power is transmitted to the relay 12, hence the switch members $C_1$ and $C_2$ are actuated as appropriate. In accordaNce with the positioning of the switch members $C_1$ and $C_2$, the field coil 13 receives a D.C. supply of positive or negative polarity to cause the chain-wheels 7 to rotate in the clockwise or the counter-clockwise direction, thereby causing the carriers 5 to ascend or descend along the side wall of the travelling frame 4. Therefore, when the amount of scrubbing pressure of the brush on the vehicle surface becomes large, the overhead brush is immediately caused to ascend, resulting in a reduced scrubbing pressure, which in turn causes the potential drop across the resistor 9 to decrease. Conversely, when it is below the predetermined value, the signal generated by amplifier 11 will not energize relay 12. As a result, the switch members $C_1$ and $C_2$ are caused to return to their original position, so that the D.C. supply to the field coil 13 is reversed in its direction, causing the chain-wheels 7 to rotate reversely. Hence, the brush 1 is caused to descend until it exerts adequate pressure on the vehicle surface. In this was, the brush is caused to ascend and descend in increments of distance as small or as large as is required by the vehicle's contours, while the frame 14 continues to travel on its track, thus enabling the brush to scrub with adequate scrubbing pressure the vehicle surface extending from the front face to the rear end face, and vice versa.

As has been seen from the foregoing, the overhead brush can be caused to ascend and descend in substantially perpendicular manner in relation to the vehicle, in accordance with the amount of its scrubbing pressure on the vehicle surface, through the load current variations associated with the motor for rotating the brush, which variations are detected and amplified to control the rotating direction of a motor for driving the brush assembly vertically. Thus, the overhead brush can be appropriately raised and lowered by a small amount. This results in a continuously optimum amount of scrubbing pressure on the vehicle surface. In such a system the brush can scrub all parts of the outer surface of the vehicle, ranging from the front face to the rear face. The amount of scrubbing pressure on the vehicle surface can be adjusted as desired, thereby preventing damage such as scratches on the vehicle surface.

The advantages of the present invention, as well as certain changes and modifications of the disclosed embodiment thereof, will be readily apparent to those skilled in the art. For example, the adjusting motor $M_2$ may be replaced by an A.C. motor in combination with an electromagnetic reversing clutch. Also, the relay 12 can be controlled in response to the voltage across the terminals of the driving motor $M_1$ rather than by load current. Relay 12 may also be replaced by an arrangement wherein the switch members $C_1$ and $C_2$ are normally in a central or neutral position between associates contact pairs, i.e, the members $C_1$ and $C_2$ do not normally close either pair of associated contacts, and may be shifted leftward or rightward by an appropriate winding/armature assembly. Such an arrangement would avoid constant switching between the opposite contact pairs when the brush is traversing a flat surface such as the hood, roof, or trunk of the vehicle being washed. It is the applicant's intention to cover all those changes and modifications which could be made to the embodiment of the invention herein chosen for the purposes of the disclosure without departing from the spirit and scope of the invention.

What is claimed is:
1. Vehicle washing apparatus comprising:
 1. a rotary brush;
 2. mounting means for positioning said rotary brush;
 3. driving means mechanically connected to said rotary brush;
 4. adjusting means mechanically connected to said mounting means to adjust the position of said rotary brush;
 5. circuit means operative to monitor the pressure exerted by the said rotary brush and to actuate said adjusting means to adjust the position of said rotary brush in response to brush pressures outside of a predetermined range;
 6. said circuit means comprising a sampling circuit means for monitoring the pressure exerted by said rotary brush by sensing the energy input to said driving means, and a relay means operative selectively to connect a source of D.C. power to said adjusting means and to reverse the polarity of said D.C. power applied to said adjusting means;
 7. said sample circuit means comprising a variable and a fixed resistor and an amplifier connected to said variable resistor and to the winding of said relay operative to generate an output signal in response to the input signal derived from said variable resistor to energize and deenergize said winding of said relay.

2. Vehicle washing apparatus according to claim 1 wherein said mounting means comprises;
 1. a travelling frame having first and second opposing side walls;
 2. first and second carrier members mounted in said first and second side walls, respectively, and moveable along the length of said side walls;
 3. a rod pivotably mounted between said carrier members; and
 4. a pair of arms rigidly mounted on said rod and having said rotary brush disposed therebetween.

3. Vehicle washing apparatus according to claim 1 wherein said driving means comprises an electric motor.

4. Vehicle washing apparatus according to claim 1 wherein said driving means comprises an A.C. motor in combination with an electromagnetic reversing clutch.

5. Vehicle washing apparatus according to claim 1 wherein said adjusting means comprises a reversible torque motor having a coil.

6. Vehicle washing apparatus according to claim 6 wherein said sampling circuit means is operative to detect fluctuations in load current flowing to said driving means.

7. Vehicle washing apparatus according to claim 1 wherein said sampling circuit means is operative to detect voltage fluctuations across the input terminals of said driving means.

8. Vehicle washing apparatus according to claim 1 wherein said relay means comprises;
 1. first and second switch members, each moveable between first and second pairs of associated contacts, said contacts being interconnected between a source of D.C. power and said adjusting means so as to apply D.C. power of a first polarity to said adjusting means when said switch members close said first pairs of contacts, and to apply D.C. power of a second polarity to said adjusting means when said switch members close said second pairs of contacts;
 2. an armature connected to said switch members; and
 3. a winding energizable by an output from said sampling circuit means to cause said switch members to move between and selectively open and close said first and second pairs of contacts.

* * * * *